US010848625B1

(12) United States Patent
Pugh (10) Patent No.: US 10,848,625 B1
(45) Date of Patent: Nov. 24, 2020

(54) HEAT DETECTION SYSTEM FOR MONITORING OF OVER-HEATING IN AN APPARATUS

(71) Applicant: KYOCERA Document Solutions Inc., Osaka (JP)

(72) Inventor: Eric Pugh, Torrance, CA (US)

(73) Assignee: KYOCERA Document Solutions Inc. (JP)

( * ) Notice: Subject to any disclaimer, the term of this patent is extended or adjusted under 35 U.S.C. 154(b) by 0 days.

(21) Appl. No.: 16/408,851

(22) Filed: May 10, 2019

(51) Int. Cl.
| H04N 1/46 | (2006.01) |
| H04N 1/00 | (2006.01) |
| G01K 1/16 | (2006.01) |
| G01K 1/14 | (2006.01) |

(52) U.S. Cl.
CPC ......... H04N 1/00037 (2013.01); G01K 1/143 (2013.01); G01K 1/16 (2013.01); H04N 1/00814 (2013.01)

(58) Field of Classification Search
CPC .......... H04N 1/00037; H04N 1/00814; G01K 1/143; G01K 1/16; G01K 1/12
See application file for complete search history.

(56) References Cited

U.S. PATENT DOCUMENTS

| 3,931,521 | A | * | 1/1976 | Cinzori | G08B 17/12 |
| | | | | | 250/339.04 |
| 6,133,569 | A | * | 10/2000 | Shoda | G01J 5/061 |
| | | | | | 250/330 |
| 2001/0028807 | A1 | * | 10/2001 | Coleman | G03G 15/2039 |
| | | | | | 399/69 |
| 2013/0016473 | A1 | * | 1/2013 | Ito | G06F 1/203 |
| | | | | | 361/679.54 |
| 2013/0195493 | A1 | * | 8/2013 | Hase | G03G 15/205 |
| | | | | | 399/69 |
| 2016/0216653 | A1 | * | 7/2016 | Yajima | G03G 15/2017 |
| 2017/0199485 | A1 | * | 7/2017 | Lee | G03G 15/2039 |

OTHER PUBLICATIONS

AdaFruit.com, Calibrating Sensors, https://learn.adafruit.com/calibrating-sensors?view=all.
AdaFruit.com, AdaFruit AMG8833 8x8 Thermal Camera Sensor, https://learn.adafruit.com/adafruit-amg8833-8x8-thermal-camera-sensor.
Panasonic Automation Controls Unit, Specifications for Infrared Array Sensor, Aug. 30, 2011.
Melexis, MLX90640 32X24 Pixel Infrared (IR) Array, www.melexis.com/MLX90640.

* cited by examiner

*Primary Examiner* — Moustapha Diaby
(74) *Attorney, Agent, or Firm* — L/O of Alexis J Saenz (57) ABSTRACT

A system and process provide an improvement to monitoring over-heating of components in an apparatus. Embodiments include a thermal sensor which may be coupled with a filter. A controller may store over-heat values for components in the apparatus. In response to a sensor signal detecting an over-heat threshold exceeded, the controller may trigger an alert. Detection of an over-heating event may trigger shutdown of the component or the entire device or system before damage occurs or escalates to other components. In some embodiments, the range of detection by sensors monitoring the same component may be extended by coupling each sensor with a different filter so that a wider range of heat signatures are available. Aspects of the method may select which sensor/filter combination has a best range of detection based on the number of pixels registering over or under a threshold value.

8 Claims, 7 Drawing Sheets

HEAT DETECTION SYSTEM FOR MONITORING OF OVER-HEATING IN AN APPARATUS

CROSS-REFERENCE TO RELATED APPLICATION

None.

FIELD

The subject disclosure relates to detection systems, and more particularly to heat detection system for monitoring of over-heating in an apparatus.

BACKGROUND

Overheating components can be costly to replace and difficult to detect when these components are enclosed in a compact embedded environment. For example, printers contain many components within close proximity to one another within a confined and small footprint of space.

Overheating components in some environments can be dangerous, such as overheating stovetop items. Overheated components in general may cause fires or at least system failure or damage to the system As can be seen, there is a need for an improvement to monitoring heat emitting components in a system.

SUMMARY

In one aspect of the disclosure, a system for detecting over-heated parts in a printing apparatus is disclosed. The system comprises a thermal detector module in the printing apparatus. The thermal detector module may include: a thermal sensor positioned proximate and disposed to detect a heat level of a heat emitting component in the printing apparatus, and an optical filter coupled to the thermal sensor. The system may also include a controller module connected to the thermal detector module. The controller module may include: a data port configured to receive a signal from the thermal detector module, and a processor connected to the data port. The processor is configured to: determine from the signal, the heat level emitted by the heat emitting component; determine whether the heat level exceeds a heat emitting threshold value; and trigger an alert in response to a determination of over-heating in the heat emitting component.

In another aspect, a system for detecting over-heated parts in a printing apparatus is disclosed. The system comprises: a first thermal sensor positioned proximate and disposed to detect a heat level of a heat emitting component in the printing apparatus; a second thermal sensor positioned proximate and disposed to detect the heat level of the heat emitting component in the printing apparatus; and a processor connected to both the first thermal sensor and to the second thermal sensor, wherein the processor is configured to: determine which of the first thermal sensor and the second thermal sensor is configured with a best detection range of heat levels being emitted from the heat emitting component, during a printing operation of the printing apparatus; detect, from a signal transmitted by the determined one of the first thermal sensor or the second thermal sensor, a detected heat level from the heat emitting component that exceeds a threshold value indicating over-heating of the heat emitting component; and trigger an alert in response to detection of over-heating in the heat emitting component.

In yet another aspect, a method of detecting over-heating parts in a printing apparatus is disclosed. The method comprises: detecting, by a first thermal detection module, a heat level of a heat emitting component in the printing apparatus, wherein the first thermal detection module includes a first optical filter coupled to a first thermal sensor; detecting, by a second thermal detection module, the heat level of the heat emitting component in the printing apparatus, wherein the second thermal detection module includes a second optical filter coupled to a second thermal sensor; determining, by a processor connected to the first thermal detection module and to the second thermal detection module, which of the first thermal detection module and the second thermal detection module is configured with a best detection range of heat levels being emitted from the heat emitting component, during a printing operation of the printing apparatus; detecting, from a signal transmitted by the determined one of the first thermal detection module or the second thermal detection module, a detected heat level from the heat emitting component that exceeds a threshold value indicating over-heating of the heat emitting component; and triggering an alert in response to detection of over-heating in the heat emitting component.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be apparent to those skilled in the art that the subject technology may be practiced without these specific details. Like or similar components are labeled with identical element numbers for ease of understanding.

As will be appreciated, embodiments disclosed below may be practiced in and have industrial applicability to the general fields of device operation and monitoring. Some embodiments in particular may have applicability to printing devices.

Generally, embodiments of the disclosure describe systems and methods for detecting when components in an apparatus are over-heating. Components in the context of a printing apparatus may be mechanical elements (for example, motors and printer fusers) or electrical elements (for example, circuit components and semiconductor chips). As will be appreciated, aspects of the disclosure prevent damage to systems and devices by detecting an over-heating component. Detection of an over-heating event may trigger shutdown of the component or the entire device or system before damage occurs or escalates to other components. While the disclosure herein is described in the context of a printing apparatus, it will be understood that the context may be for purpose of illustration only and that other machine systems may embody aspects of the subject technology herein.

Figure 1:
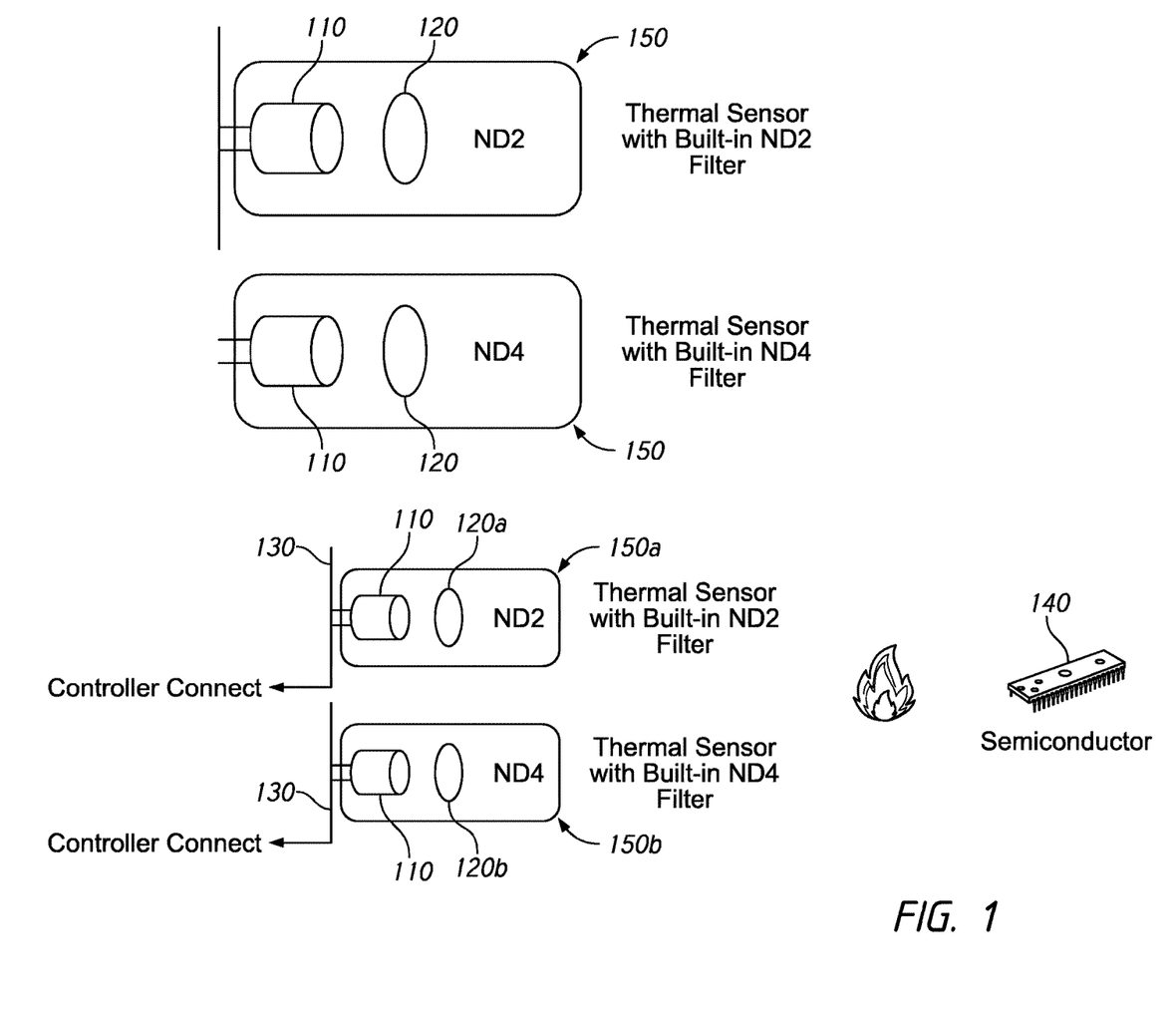
FIG. 1 is a diagrammatic view of thermal detection modules positioned proximate a heat emitting element in accordance with exemplary embodiments of the subject technology.

Referring now to FIG. 1, thermal detection modules 150 are shown according to an exemplary embodiment. The thermal detection modules 150 may include a thermal sensor 110. In some embodiments, a filter 120 may be coupled to the thermal sensor 110. While the filters 120 are shown as floating or exploded from the thermal sensors 110, it will be understood that the filters 120 may be attached directly to the front of the thermal sensors 110. A thermal detection module 150 may integrate the thermal sensor 110 and filter 120 into a single package. Thermal sensors 110 may be selected from detectors that operate in the infrared region from 700 nm to 1 mm. The thermal sensors 110 may operate using 3.3V and may draw low power, consuming less than, for example, 100 mA. As will be appreciated, the low power draw makes the thermal detection modules 150 a cost-effective solution for monitoring overheating in a system.

Generally, the thermal detection modules 150 may be positioned proximate to a heat emitting component. In an exemplary embodiment, the thermal sensors 110 may be positioned to detect heat levels from a particular heat emitting component in a system. The thermal detection modules 150 may be pointed so that the field of view (or field of regard) of their thermal sensor 110 is optimized to detect heat signatures from the heat emitting component during operation of an apparatus or system. For example, the thermal sensor 110 may be pointed at a semiconductor chip 140. The thermal detection module 150 or thermal sensor 110 therein may be registered within a memory as associated with the semiconductor chip 140 that it is proximate to or pointed at. Signals from the thermal detection module 150 associated with the semiconductor chip 140 may be compared to stored values related to the operation of the heat emitting component to check whether overheating has occurred for the semiconductor chip 140. The stored values may be obtained from manufacturers' operating specifications. The measurement of heat may involve calibration and a table value lookup for the signal levels received by the thermal detection module 150.

For example, some thermal sensors 110 may include a configurable interrupt pin that may be triggered on pixel under values or pixel overvalues. A thermal sensor 110 without ND filters may detect for example, a temperature range of 0° C. to 80° C. (32° F. to 176° F.). In an exemplary operation, a system embodiment may use the interrupt to perform a power shutdown of an over-heated component or issue a notification of over-heating (for example, by a digital display announcement on the apparatus or by telecommunication such as SMS, email, voice, or cloud-based messaging). Pixel-under values or pixel-over values may be used to set registers that would trigger interrupts when the incoming measured values go below the pixel-under value or above the pixel-over value. The values may be used to set a monitored temperature range. Pixel-under values or pixel-over values may be detected by performing two steps. The first step may be to initialize the underflow and/or overflow interrupt registers with the threshold value(s). The second step may be to specify which pixels in the thermal sensor 110's grid array are to be tracked. The user can choose to select none, some, or all pixels in the array. These two steps provide support for tracking pixels that exceed the threshold values. When a heat level (for example, a temperature or light level registered by an optical detector) exceeds the limits of the thermal sensor 110, the filter 120 may limit the amount of light by a predetermined amount so that sensor overload is not encountered. The predetermined amount may be based on for example, the filter rating of the filter. Multiple sensor/filter units may be used to determine the temperature provided by mapped RGB values. Mapped RGB values may be for example, color values registered by the system that may be mapped to a temperature. For example, for a range of 0° C. to 80° C. (32° F. to 176° F.), temperature values on the higher end of the range may be mapped to red values. Temperatures on the lower end of the range may be mapped to blue values. The thermal detection module 150's interrupt pin signal may be used to indicate which thermal detection module 150 has encountered sensor overload. The thermal detection module 150 may be programmed to ignore overload values when the interrupt pin signal is triggered. Some embodiments may use only the readings from those thermal detection modules 150 that did not show any signal on the interrupt pin. The thermal detection module 150 may generate an interrupt signal when values are detected that exceed the underflow/overflow threshold values in the enabled pixels. If one of the multiple thermal sensors 110 in an implementation measures pixel values that do not exceed underflow or overflow thresholds then this thermal sensor 110 would be considered to provide "good" temperature values, which may be within the programmed range of values for detection. Other thermal sensors 110 that generate underflow or overflow interrupts would provide "bad" temperature values, which would be considered outside the programmed range of detection. If all thermal sensors 110 provide "bad" temperature values, then the support software may decide to use the maximum temperature value from the sensor 110/filter 120 unit that has the highest temperature range.

The filters 120 may be optical filters, for example, neutral density (ND) filters. In some embodiments, two or more thermal detection modules 150 may be positioned to detect the heat level from the same component. The filters 120 of respective thermal detection modules 150 detecting the same component may have different filter types or filter ratings. The filter ratings selected for filters 120 may be based on a range of transmissivity for a range of temperatures expected to be emitted by the components being monitored. For example, FIG. 1 shows on the bottom of the drawing, two different thermal detection modules $150_a$ and $150_b$ positioned to monitor the same semiconductor chip 140. However, filter $120_a$ is a ND2 number filter while filter $120_b$ is a ND4 number filter. The thermal sensors 110 may be the same type with the same operating range in thermal detection modules $150_a$ and $150_b$. The first filter 120 may include a first transmissivity range, which may be different from a second transmissivity range of the second filter 120. By using different number ND filters, the detection range of thermal detection module $150_a$ may be different than the detection range of thermal detection module $150_b$. Signals detected by the respective thermal sensors 110 may be transmitted from the thermal detection modules 150 through buses 130.

In operation, the thermal sensor 110 may use infrared absorption to determine the amount of thermal radiation being received. The filter 120 limits the amount of infrared energy signature received by predetermined amounts. These filters 120 may be viewed as scalers that reduce the amount of thermal energy detected by predetermined amounts. For example, a neutral density filter reduces the amount of incoming light by predetermined amounts across a uniform spectral range. Each pixel of a thermal sensor 110 would be exposed to a reduced amount of light energy. The ND filter 120 may reduce the amount of incoming light energy and allow the thermal sensor 110 to be exposed to in-range values. As an example, an ND2 filter would reduce the amount of incoming light by a factor of 2. An ND4 filter reduces the amount of light by a factor of 4. The corresponding sensor values would be related by a formula similar to "v'=v*k" where the factor k would be related to the ND* factor. A calibration process may be used to generate the k values, but in its simplest form, for the example above it would be 0.5. Predetermined amounts of reduction include for example:

ND2—reduce sensor input by ×2.
ND4—reduce sensor input by ×4.
ND8—reduce sensor input by ×8.
ND16—reduce sensor input by ×16.

As will be appreciated, using thermal detection modules 150 with different filters 120 may extend the measured range of temperatures detectable for a component. This approach is cost-effective because it uses relatively inexpensive filters to extend the detection range of a relatively inexpensive thermal sensor 110. In monitoring for over-heating, one process may check the highest scaled thermal detection module 150 to see if the measured values include a number of illuminated pixels within a stored range of values indicating an acceptable operating temperature for the component. If this is not the case, the next lower scaler unit (thermal detection module 150 with filter 120 of a higher ND number) would be used to collect values, and so on.

Figure 2:
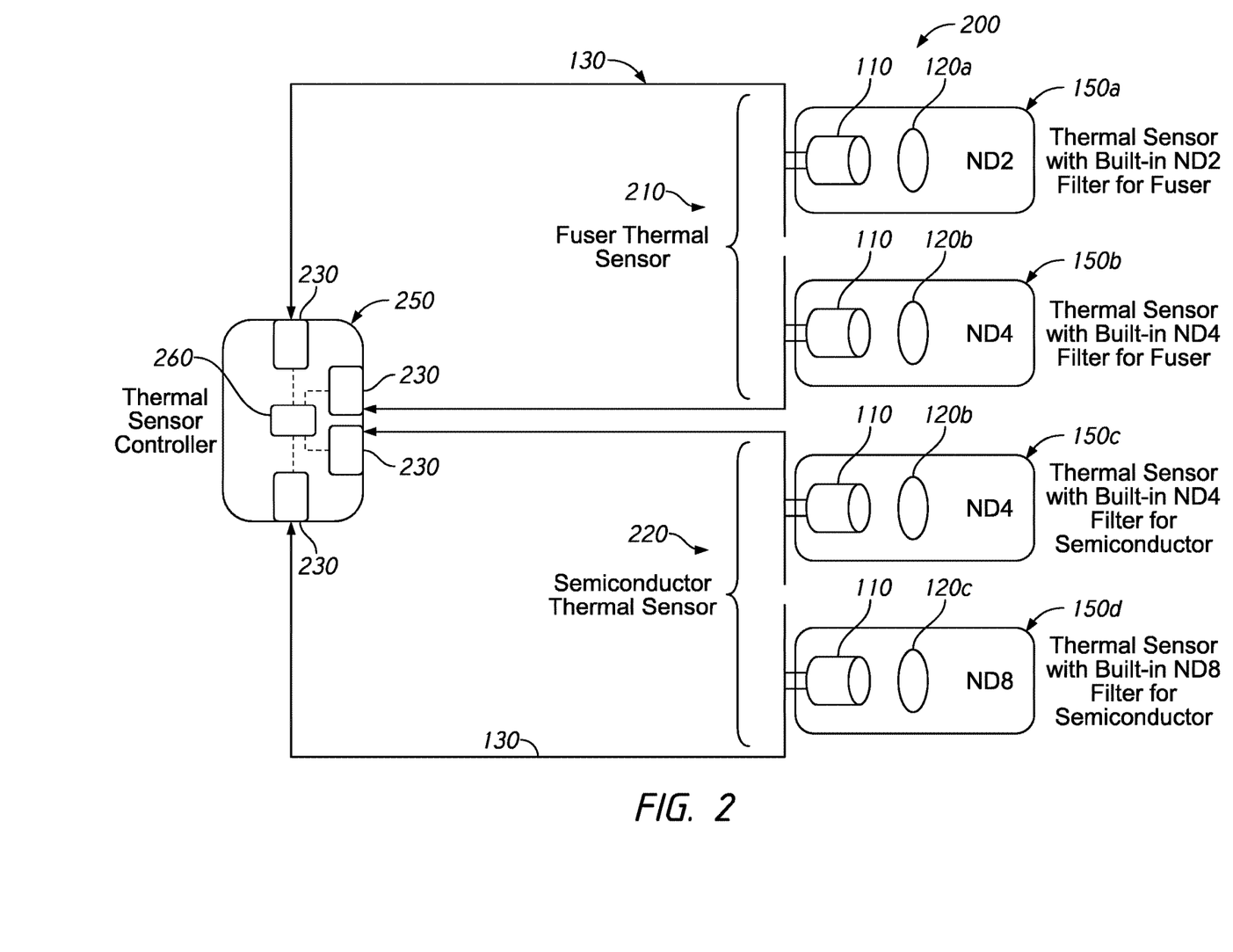
FIG. 2 is a diagrammatic view of a system for detecting over-heated parts in accordance with an exemplary embodiment of the subject technology.
Figure 3:
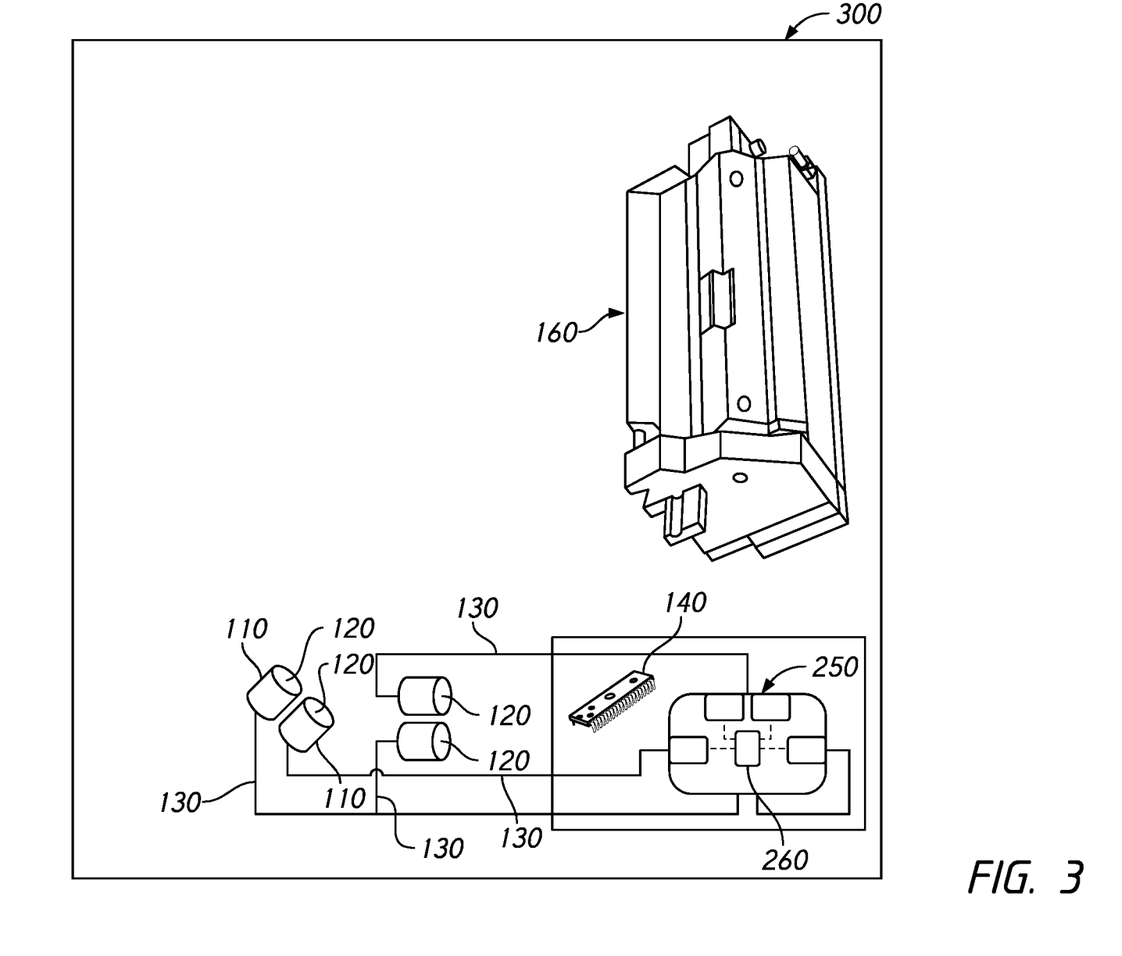
FIG. 3 is a diagrammatic view of the system of FIG. 2 in a printing apparatus in accordance with an exemplary embodiment of the subject technology.

Referring now to FIGS. 2 and 3, a thermal detection system 200 for detecting over-heated parts in an apparatus 300 is shown according to exemplary embodiments. For purposes of illustration, the apparatus 300 being monitored may be a printing apparatus. As may be appreciated, the system 200 may be configured to detect the heat levels of multiple components in the apparatus 300, which may be a crowded or compact area. The exemplary embodiment in FIGS. 2 and 3 show a system 200 for monitoring two components: the semiconductor chip 140 and the fuser 160. While only two components are shown in this example, it will be understood that the system 200 may be configured to monitor more than two components, however for sake of illustration, the monitoring of only two components are being described. FIG. 2 shows the system 200 represented as block diagram. FIG. 3 illustrates and example of the system 200 monitoring the two components 140 and 160 in a simulated working environment of the printing apparatus 300.

The system 200 includes one or more thermal detection modules 150. The system 200 may include a controller module 250 connected to the thermal detection modules 150. The controller module 250 may include data ports 230 connected to respective output lines of thermal sensors 110 via busses 130. The data ports 230 may receive heat level signals from respective thermal detection modules 150. In an exemplary embodiment, the processor 260, connected to the data ports 230, may be configured to: determine from the incoming signals, the heat level emitted by the heat emitting component monitored by respective thermal detection modules 150. In some embodiments, wherein the processor 260 may include a programmed range of heat detection for each thermal detection module 150. The processor 260 may also determine whether the heat level detected by a thermal detection module 150 exceeds a heat emitting threshold value. The heat threshold value may be stored in for example, firmware, another accessible memory storage, or inherently by operation of circuitry, for example, a breaker which triggers when a signal level exceeds a breaker rating or a logic gate-based circuit. The processor 260 may trigger an alert in response when the heat emitting component heat level is over-heating. The alert may be audible, displayed in the apparatus' user interface display, or sent by telecommunication to a user or system administrator's computing device connected to the apparatus.

The system 200 may be divided up into a module 210 for detecting heat levels of the fuser 160 and a module 220 for detecting the heat levels of the semiconductor chip 140. The module 210 may comprise the thermal detection module $150_a$ and thermal detection module $150_b$ (which were described previously with respect to FIG. 1). The module 210 with the ND2/ND4 filters may be limited to detecting temperature in a range of 0° C. to 320° C. (32° F. to 608° F.). The module 220 may comprise a thermal detection module $150_c$ and a thermal detection module $150_d$. The thermal detection module 150 is similar to the thermal detection module $150_b$ (which includes in this example, a thermal sensor 110 and a filter $120_b$). The thermal detection module $150_d$ may include a thermal sensor 110 and a filter 120 which may be for example, a ND8 number filter. As shown in FIG. 3, the semiconductor chip 140 and the fuser 160 may be positioned in separate but proximate areas of the apparatus 300. The semiconductor chip 140 and the fuser 160 are shown floating in the apparatus 300 for sake of illustration so that other physical elements in the apparatus do not confuse what is in the scene. A pair of the thermal sensors 110 and their respective filters 120 (which may be for example, the module 210 of FIG. 2) may be positioned in the apparatus 300 to point at the fuser 160. Another pair of the thermal sensors 110 and their respective filters 120 (which may be for example, the module 220 of FIG. 2) may be pointed at the semiconductor chip 140. Busses 130 from each thermal sensor 110 may be connected to the controller module 250.

For the following methods, the steps below will be identified by numerals in parenthesis.

Figure 4:
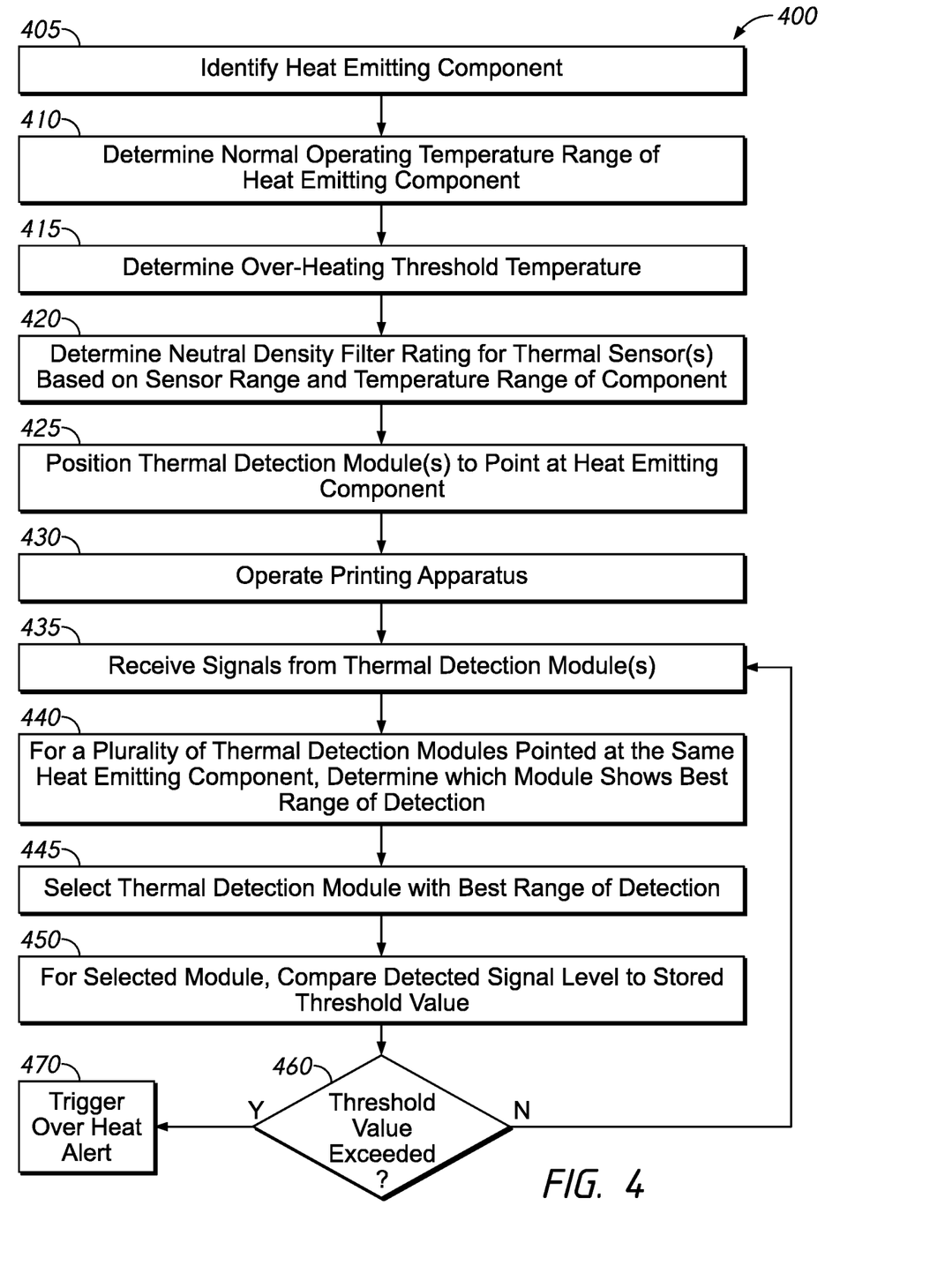
FIG. 4 is a flowchart of a method of detecting over-heating parts in a printing apparatus in accordance with embodiments of the subject technology.

Referring now to FIG. 4, a method 400 of detecting over-heating parts in a printing apparatus is shown according to an exemplary embodiment. The method 400 may include identifying (405) a heat emitting component in a system. In some embodiments, a file may be stored in an electronic database for each component identified. The method 400 may include determining (410) a normal operating temperature range for the identified component. An over-heating threshold level for the identified component may be determined (415). The threshold level indicating over-heating may be based on a manufacturer's specification or by testing the component for operational failure. Any information related to heat levels for each component including normal operating levels and overheat levels may be stored in the file for each component as described herein. In some embodiments, a neutral density filter rating for a thermal sensor monitoring the component may be determined (420). The filter rating may be based on the sensor's detection range and the operating temperature range of the component. For example, components which may operate at temperatures exceeding the detection range of the thermal sensor may need a higher ND number filter to reduce the amount (for example, intensity) of light incident on the thermal sensor. For a thermal detection module setup for a designated component, the thermal detection module may be positioned (425) proximate to the designated component. In some embodiments, the thermal sensor in the module may have a line of sight and point at the designated component. During operation (430) of the apparatus that has the component being monitored, (for example, a semiconductor chip type component in a printing apparatus), a controller may receive (435) heat level based signals of the component from the thermal detection module. In some embodiments, multiple thermal detection modules may be monitoring the same component. The method 400 may include determining (440) which thermal detection module shows a best range of detection. The thermal sensor module with the best range of detection may be selected (445). The received heat level signal from the thermal detection module monitoring the component (and selected in the case of multiple detection modules for one component), may be compared (450) to a stored threshold level value indicating over-heating. The controller may determine (460) whether the received heat level signal exceeds the stored threshold value. In response to the threshold level value being exceeded, an alert may be triggered (470) indicating overheating in the system, the apparatus, or in a specifically identified component. In some embodiments, the overheated component may be specifically identified (which may be for example, displayed in a user panel of the apparatus or a user interface in communication with the apparatus). In the alternative, if the stored threshold level value is not exceeded, the method may continuously monitor the incoming heat level signal until it exceeds the threshold level value.

Figure 5:
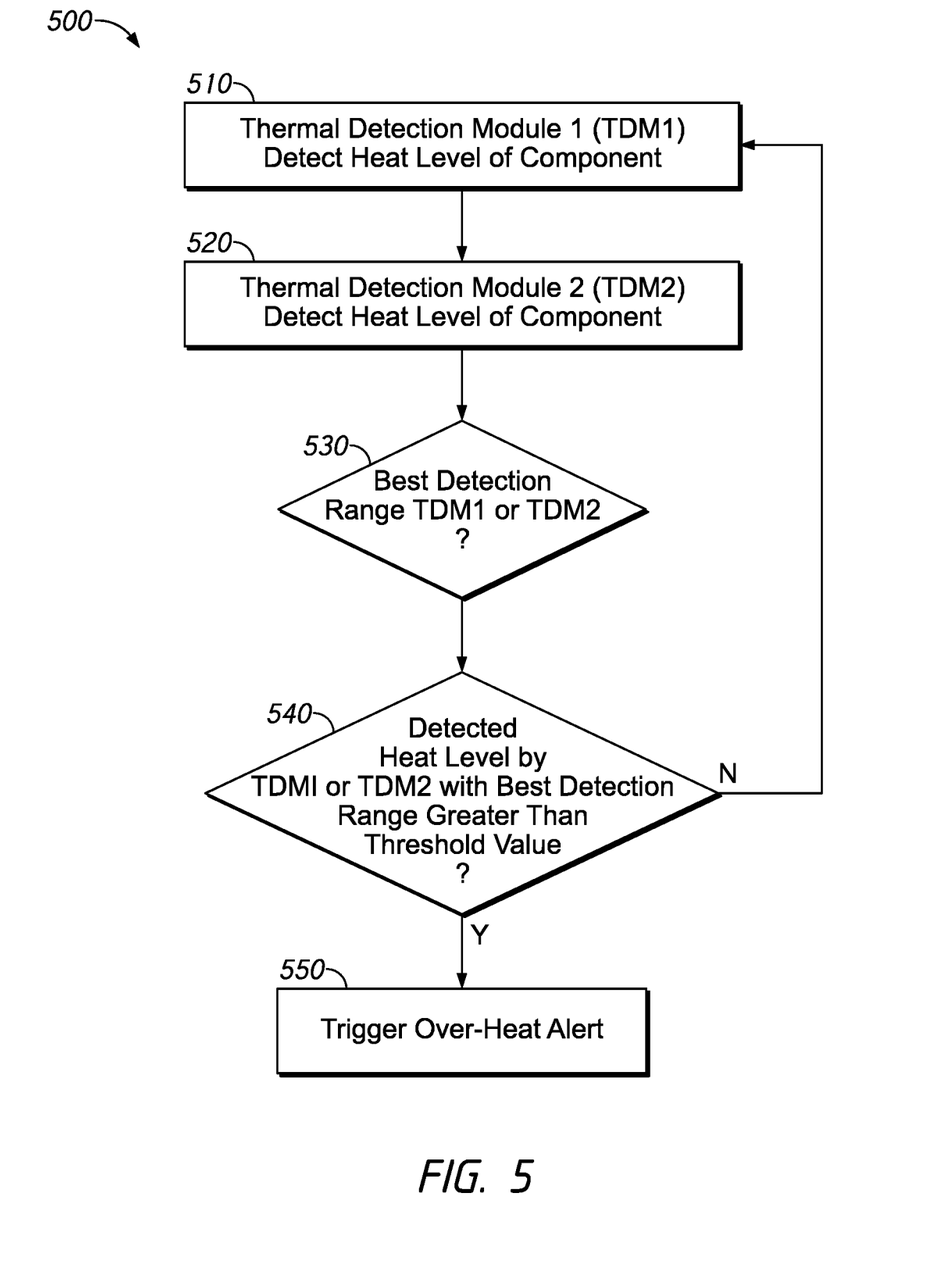
FIG. 5 is a flowchart of a method of determining an over-heat condition for a component in accordance with embodiments of the subject technology.

Referring now to FIG. 5, a method 500 of determining an over-heat condition for a component is shown according to an exemplary embodiment. The method expands on blocks 440, 445, and 450 of method 400. While two thermal detection modules are described, it will be understood that more than two thermal detection modules may be involved and that the heat detection information from the best of all thermal detection modules monitoring a component may be used. In an exemplary application, one heat emitting component may be monitored by two separate thermal detection modules. Depending on the heat level emitted by the component, one thermal detection module may be configured for a better range of detection than the other thermal detection module. For example, the first thermal detection module may be configured to register a lower range of temperatures than the second thermal detection module. The normal operating temperature for the heat emitting component may be in the lower range of temperatures. Should the heat emitting component overheat excessively, the heat signal may overwhelm the detection range of the first detection module, which may not register a valid signal. The second thermal detection module may be configured to detect temperature ranges outside the range of the first heat detection module, which in some cases may be an overheat condition. In an exemplary embodiment, during operation of an apparatus with the component being monitored, the heat level signal registered by a first thermal detection module may be detected (510). The heat level of a second thermal detection module may also be detected (520). Based on the signals received from both thermal detection modules, a controller may determine (530) which of the thermal detection modules has a best range for detecting a current heat level signal from the component. The determination may be based on for example, whether one thermal detection module or the other is registering over-saturation of pixels or under saturation of pixels. For example, oversaturation of pixels may signify that the current heat level is beyond the detection range for the sensor in a thermal detection module. Undersaturation may signify that the current heat level signal is below the detection range for a thermal detection module. In an exemplary embodiment, the controller may be programmed to expect an operating range of detection for each thermal detection module. For a current reading, the thermal detection module selected may be based on the module with the least number of pixels registering, for example an infrared signature over or under: the first programmed range of heat detection for the first thermal detection module, and the second programmed range of heat detection for the second thermal detection module. Generally, the first programmed range of heat detection for the first thermal detection module does not equal the second programmed range of heat detection for the second thermal detection module, although there may be some overlap in the ranges. For the thermal detection module determined to have the best range of detection, the controller may determine (540) whether the heat level detected by the thermal detection module exceeds the threshold level value. In the event, the threshold value is exceeded, the controller may trigger (550) an alert.

Example Configuration

The following is a disclosure related to a working model using an actual product available for detecting heat levels. For a thermal sensor being an AMG8833 8×8 Thermal Camera Sensor2, an unmodified thermal sensor is capable of detecting 0° C. to 80° C. (32° F. to 176° F.) with an accuracy of +−2.5° C. (4.5° F.). A modified thermal sensor with a ND2 neutral density filter positioned over the detection area of the sensor reduces amount of incoming light by factor of 2 and is capable of detecting an extended temperature range of:

t'=t*2*k, where k is a calibration factor between 0 and 1.

The modified thermal sensor is thus capable of detecting 0° C. to 160° C. (32° F. to 356° F.) with an accuracy of +−2.5° C. (4.5° F.).

The same thermal sensor with a ND4 neutral density filter reduces the amount of incoming light by factor of 4 and is capable of detecting extended range of:

t'=t*4*k, where k is a calibration factor between 0 and 1.

Calibration

For the calibration of a thermal sensor without ND filters, the process includes:

calibrating at low and high range temperature values, for example, at a freezing point of 0° C. and at an upper end of 80° C. for pixel values.

In an exemplary process, one may use two-point calibration method1, lowmeas, highmeas lowref=0.01° C., highref=80° C.

t'=(t−lowmeas)*79.9/(highmeas−lowmeas)+0.01.

For the calibration of a thermal sensor with ND filters, the process includes:

calibrating at low and high range temperature values, for example, a freezing point 0° C. and a boiling point 100° C.

In an exemplary process, one may use two-point calibration method1, lowmeas, highmeas lowref=0.01° C., highref=100° C.

t80=(80−lowmeas)*99.9/(highmeas−lowmeas)+0.01 k=t80/80 t'=k*((t−lowmeas)*99.9/(highmeas−lowmeas)+0.01)

Figure 6:
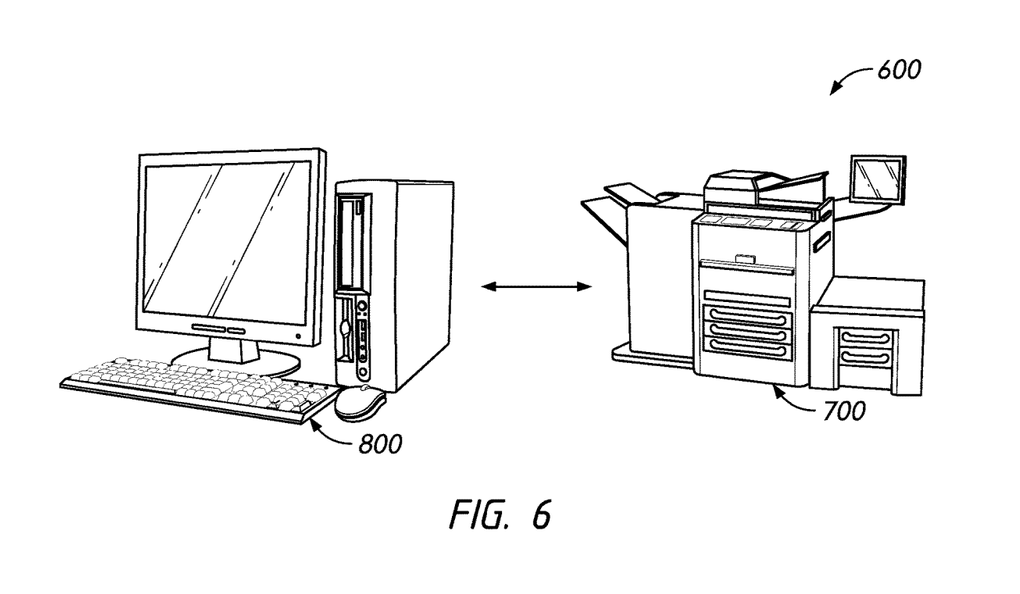
FIG. 6 is a schematic of a networked system in accordance with an embodiment of the subject technology.
Figure 7:
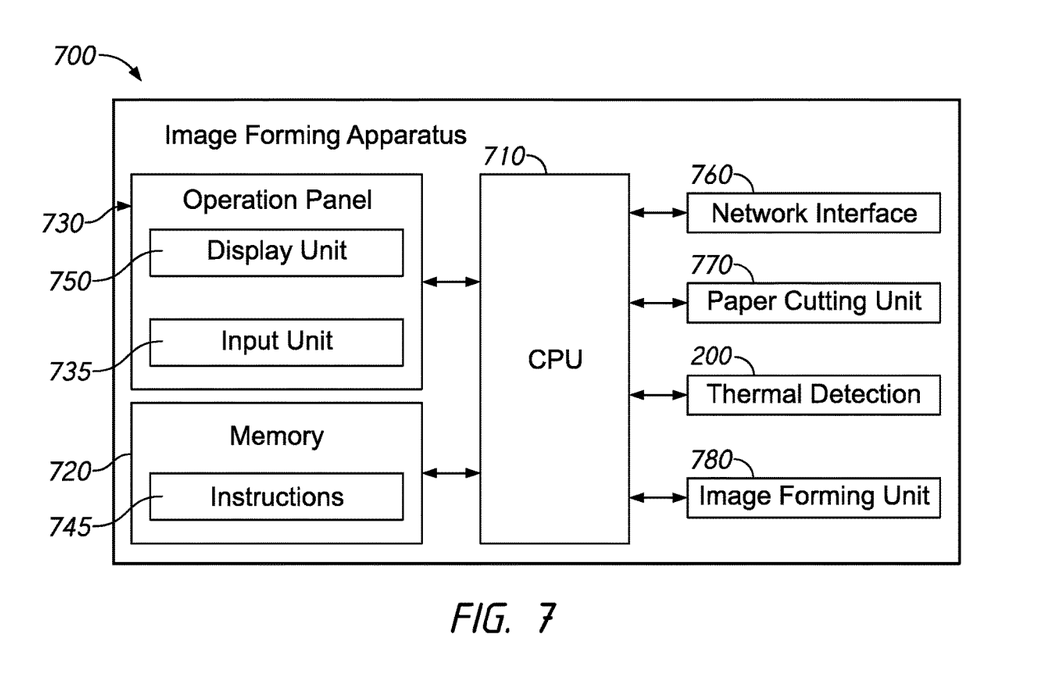
FIG. 7 is a block diagram of an image forming apparatus in accordance with an embodiment of the subject technology.
Figure 8:
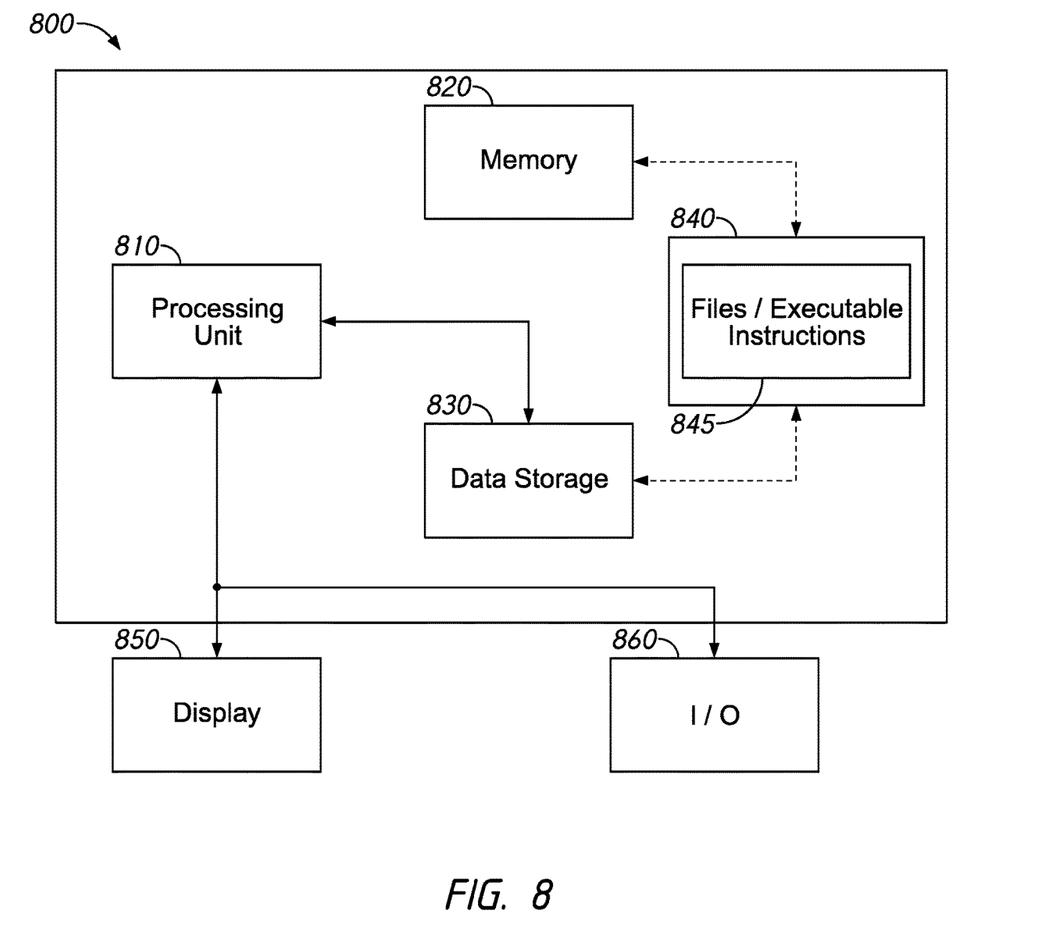
FIG. 8 is a block diagram of a computing device in accordance with an aspect of the subject technology.

Referring now to FIGS. 6-8, a system and machines of the subject technology are shown according to exemplary embodiments. A system 600 is shown in FIG. 6 which may include an image forming apparatus 700 connected to a computing device 800. In some embodiments, the above described process(es) may be loaded as executable instructions into one or both of the image forming apparatus 700 and the computing device 800. FIG. 7 shows a schematic example of the image forming apparatus 700. FIG. 8 shows a schematic example of a computing device 800. In general, the process(es) above may be implemented by either or both the image forming apparatus 700 and the computing device 800. In addition, it will be understood that multiple instances of the computing device 800 may be connected to the same image forming apparatus 700, however, for sake of illustration, a single computing device 800 is shown. In an exemplary operation, a computing device(s) 800 may receive overheat alerts from the image forming apparatus 700 as described above.

The image forming apparatus 700 may be an example of the apparatus 300 described above. The image forming apparatus 700 may be for example, a computing-based image processing and/or printing device (for example, a printer, a fax machine, a copier machine, a scanner, or a multi-function printer that may include a combination of these plus for example, a paper cutting unit 770). In an exemplary embodiment, the apparatus 700 includes a thermal detection system 200. The elements described herein with respect to the image forming apparatus may be additional examples of heat emitting components that may be monitored under aspects of the embodiments disclosed above.

The components of the image forming apparatus 700, may include, but are not limited to, one or more processors or processing units 710, a system memory 720, an operation panel 730, an input unit 735, a set of program modules 745 including files and executable instructions, a display unit 750, a network interface 760, a paper cutting unit 770, an image forming unit 780, and a bus system that couples various system components including the system memory 720 to the processor(s) 710. The memory storage 720 may store for example, executable instructions and/or electronic versions of the image objects to be printed or scanned. In some embodiments, the processors 710 may include a processing unit dedicated to graphics and image processing (for example a graphics processing unit (GPU) or visual processing unit (VPU). As a GPU or VPU, the processor 710 may implement executable instructions focused on image processing applications either alone or in coordination with other general processor 710 types such a CPUs, microchips, and the like. The input unit 735 may be for example, an I/O port receiving data from a computing device 800. The image forming unit 780 may be for example, a scanner module that translates a scanned image into a computer readable format such as a bitmap. In other embodiments the image forming unit 780 may be for example, a raster image processor and drum roller combination (as used in laser printers) or for example, a print head, stepper motor, and controller (as used in ink jets). In some embodiments, operation of the image forming unit 780 may be controlled by a user interface accessed by either the operation panel 730 on the apparatus or through a user interface displayed via a program module 745 through a user's computing device that is connected to the apparatus 700. In some embodiments, any of the components above may be monitored by the thermal detection system 200. However, it will be understood that other heat emitting components which may be in the apparatus 700 but not described above may be present and monitored.

The computing device 800 may be for example, a computer system or a computer server. In some embodiments, the image forming apparatus 700 may be another example of a computing device 800. As will be appreciated, some aspects of the embodiments disclosed above may turn the computing device 800 into a special purpose computer system. For example, in the role of a host server, the computing device 800 may implement for example the functions of alerting a system administrator to an image forming apparatus failure due to an overheated component. In the role of a user device, the computing device 800 is generally not a server but may instead be desktop computers, tablet or laptop computers, all-in-one computer stations, a mobile computing device (for example, a smart phone, smart wearable devices (glasses, jewelry, watches, ear wear, etc.), or programmable electronics, which may alert the user to the operational status of an apparatus and may identify the cause of an apparatus' failure due to an overheated component.

The components of the computing device 800, may include, but are not limited to, one or more processors or processing units 810, a system memory 820, data storage 830, a computer program product 840 having a set of program modules 845 including files and executable instructions, and a bus system that couples various system components including the system memory 820 to the processor(s) 810. The memory storage 820 may store for example, electronic files of the image objects to be printed. In some embodiments, the processors 810 may include a processing unit dedicated to graphics and image processing (for example a graphics processing unit (GPU) or visual processing unit (VPU). As a GPU or VPU, the processor 810 may implement executable instructions focused on image processing applications either alone or in coordination with other general processor 810 types such a CPUs, microchips, and the like.

The computing device 800 may be described in the general context of computer system executable instructions, such as the program modules 845 which represent a software embodiment of the system and processes described generally above with respect to FIGS. 1-5. The program modules 845 generally carry out the functions and/or methodologies of embodiments as described above. The computing device 800 may typically include a variety of computer system readable media. Such media could be chosen from any available media that is accessible by the computing device 800, including non-transitory, volatile and non-volatile media, removable and non-removable media for use by or in connection with an instruction execution system, apparatus, or device. A computer readable storage medium may be, for example, but not limited to, an electronic, magnetic, optical, electromagnetic, infrared, or semiconductor system, apparatus, or device, or any suitable combination of the foregoing. The system memory 820 could include one or more computer system readable media in the form of volatile memory, such as a random-access memory (RAM) and/or a cache memory. By way of example only, the data storage system 830 may read from and write to a non-removable, non-volatile magnetic media device. The system memory 820 may include at least one program product 840 having a set of program modules 845 that are configured to carry out the functions of embodiments of the invention in the form of computer executable instructions. The program product/utility 840 may be stored in the system memory 820 by way of example, and not limitation, as an operating system, one or more application programs, other program modules, and program data. Some embodiments may generate an electronic user interface (viewable and controllable from the display unit 750 or display 850) that may allow the user to monitor the heat levels of components in the image forming apparatus 700 and identify which component(s) is overheated in the event of a system failure.

The computing device 800 may communicate with one or more external devices including for example, an electronic display 850 which may in some embodiments be configured for tactile response as in a touch screen display. User input into the display 850 may be registered at the processor 810 and processed accordingly. Other devices may enable the computing device 800 to communicate with one or more other computing devices, either by hardwire or wirelessly. Such communication can occur via Input/Output (I/O) interfaces/ports 860.

The computing device 800, through the I/O interface/ports 860, may communicate with one or more networks such as a local area network (LAN), a general wide area network (WAN), and/or a public network (e.g., the Internet) via a network adapter as is commonly known in the art. Each of the operating system, one or more application programs, other program modules, and program data or some combination thereof, may include an implementation of a networking environment. In some embodiments, the computing device 800 may be a cloud computing node connected to a cloud computing network (not shown). The computer computing device 800 may be practiced in distributed cloud computing environments where tasks are performed by remote processing devices that are linked through a communications network. In a distributed cloud computing environment, program modules may be located in both local and remote computer system storage media including memory storage devices. Thus, for example, network administrators or image forming apparatus service providers may monitor the operational status of image forming apparatuses remotely and may diagnose repair based on overheated components, the repair instructions for which may be transmitted to a local technician.

As will be appreciated by one skilled in the art, aspects of the disclosed invention may be embodied as a system, method or process, or computer program product. Accordingly, aspects of the disclosed invention may take the form of an entirely hardware embodiment, an entirely software embodiment (including firmware, resident software, microcode, etc.) or an embodiment combining software and hardware aspects that may all generally be referred to herein as a "module", "circuit", or "system." Furthermore, aspects of the disclosed invention may take the form of a computer program product embodied in one or more computer readable media having computer readable program code embodied thereon. In some embodiments, the output of the computer program product provides an electronic user interface on the display 850 which may be controlled via direct contact with the display 850 or via the I/O interfaces 860 (which may be for example, interface devices such as keyboards, touchpads, a mouse, a stylus, or the like).

Aspects of the disclosed invention are described above with reference to block diagrams of methods, apparatus (systems) and computer program products according to embodiments of the invention. It will be understood that each block of the block diagrams, and combinations of blocks in the flowchart illustrations and/or block diagrams, can be implemented by computer program instructions. These computer program instructions may be provided to the processor 810 of a general-purpose computer, special purpose computer, or other programmable data processing apparatus to create a machine, such that the instructions, which execute via the processor of the computer or other programmable data processing apparatus, create means for implementing the functions/acts specified in the flowchart and/or block diagram block or blocks in the figures.

Those of skill in the art would appreciate that various components and blocks may be arranged differently (e.g., arranged in a different order, or partitioned in a different way) all without departing from the scope of the subject technology. The previous description is provided to enable any person skilled in the art to practice the various aspects described herein. The previous description provides various examples of the subject technology, and the subject technology is not limited to these examples. For example, it will be understood that while the above disclosure related to a printing environment, other applications may benefit from aspects of the disclosure. For example, a residential environment may adapt aspects of the disclosure to monitor heat emitting elements in the home. The thermal detection modules may be connected to a smart hub (in the role of the controller described above) which may monitor different parts of the home for over-heating. For example, a stovetop may be monitored to check whether a pot or pan in a cooking process is over-heating indicating for example, it has been forgotten. In another example, an appliance may be monitored (for example, a toaster) so that if a food item burns, the alert may be triggered prior to a fire occurring. Various modifications to these aspects will be readily apparent to those skilled in the art, and the generic principles defined herein may be applied to other aspects.

Thus, the claims are not intended to be limited to the aspects shown herein, but are to be accorded the full scope consistent with the language of claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the invention.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such an embodiment may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. A system for detecting over-heated parts in a printing apparatus, comprising:
   a first thermal sensor positioned proximate a heat emitting component in the printing apparatus and disposed to detect a heat level of the heat emitting component;
   a second thermal sensor positioned proximate the heat emitting component in the printing apparatus and disposed to detect the heat level of the heat emitting component;
   a first optical filter coupled to the first thermal sensor and a second optical filter coupled to the second thermal sensor; and
   a processor connected to both the first thermal sensor and to the second thermal sensor, wherein the processor is configured to:
      determine which of the first thermal sensor and the second thermal sensor is configured with a best detection range of heat levels being emitted from the heat emitting component, during a printing operation of the printing apparatus;
      detect, from a signal transmitted by the determined one of the first thermal sensor or the second thermal sensor, a detected heat level from the heat emitting component that exceeds a threshold value indicating over-heating of the heat emitting component; and
      trigger an alert in response to detection of over-heating in the heat emitting component, wherein:
      the first optical filter coupled to the first thermal sensor provides a first programmed range of heat detection in the processor,
      the second optical filter coupled to the second thermal sensor provides a second programmed range of heat detection in the processor,
      the first programmed range of heat detection does not equal the second programmed range of heat detection, and
      the first programmed range of heat detection and the second programmed range of heat detection are based on a number of pixels registering an infrared signature from the heat emitting component during operation of the heat emitting component.

2. The system of claim 1, wherein the first optical filter includes a first transmissivity range different from a second transmissivity range of the second optical filter.

3. The system of claim 1, wherein the first optical filter and the second optical filter are neutral density filters of different neutral density ratings.

4. The system of claim 3, wherein the first thermal sensor and the second thermal sensor are a same type of thermal sensor.

5. The system of claim 1, wherein the best detection range of heat levels is based on which of the first thermal sensor and the second thermal sensor have a least number of pixels registering an infrared signature over or under:
   the first programmed range of heat detection for the first thermal sensor, and
   the second programmed range of heat detection for the second thermal sensor.

6. A method of detecting over-heating parts in a printing apparatus, comprising:
   detecting, by a first thermal detection module, a heat level of a heat emitting component in the printing apparatus, wherein the first thermal detection module includes a first optical filter coupled to a first thermal sensor;
   detecting, by a second thermal detection module, the heat level of the heat emitting component in the printing apparatus, wherein the second thermal detection module includes a second optical filter coupled to a second thermal sensor;
   determining, by a processor connected to the first thermal detection module and to the second thermal detection module, which of the first thermal detection module and the second thermal detection module is configured with a best detection range of heat levels being emitted from the heat emitting component, during a printing operation of the printing apparatus, wherein the best detection range of heat levels is based on which of the first thermal sensor and the second thermal sensor have a least number of pixels registering an infrared signature over or under a stored threshold number of pixels for the respective thermal sensors;
   detecting, from a signal transmitted by the determined one of the first thermal detection module or the second thermal detection module, a detected heat level from the heat emitting component that exceeds a threshold value indicating over-heating of the heat emitting component; and
   triggering an alert in response to detection of over-heating in the heat emitting component.

7. The method of claim 6, wherein the first optical filter is a different type of filter than the second optical filter.

8. The method of claim 6, wherein the first optical filter includes a first transmissivity range different from a second transmissivity range of the second optical filter.

* * * * *